UNITED STATES PATENT OFFICE.

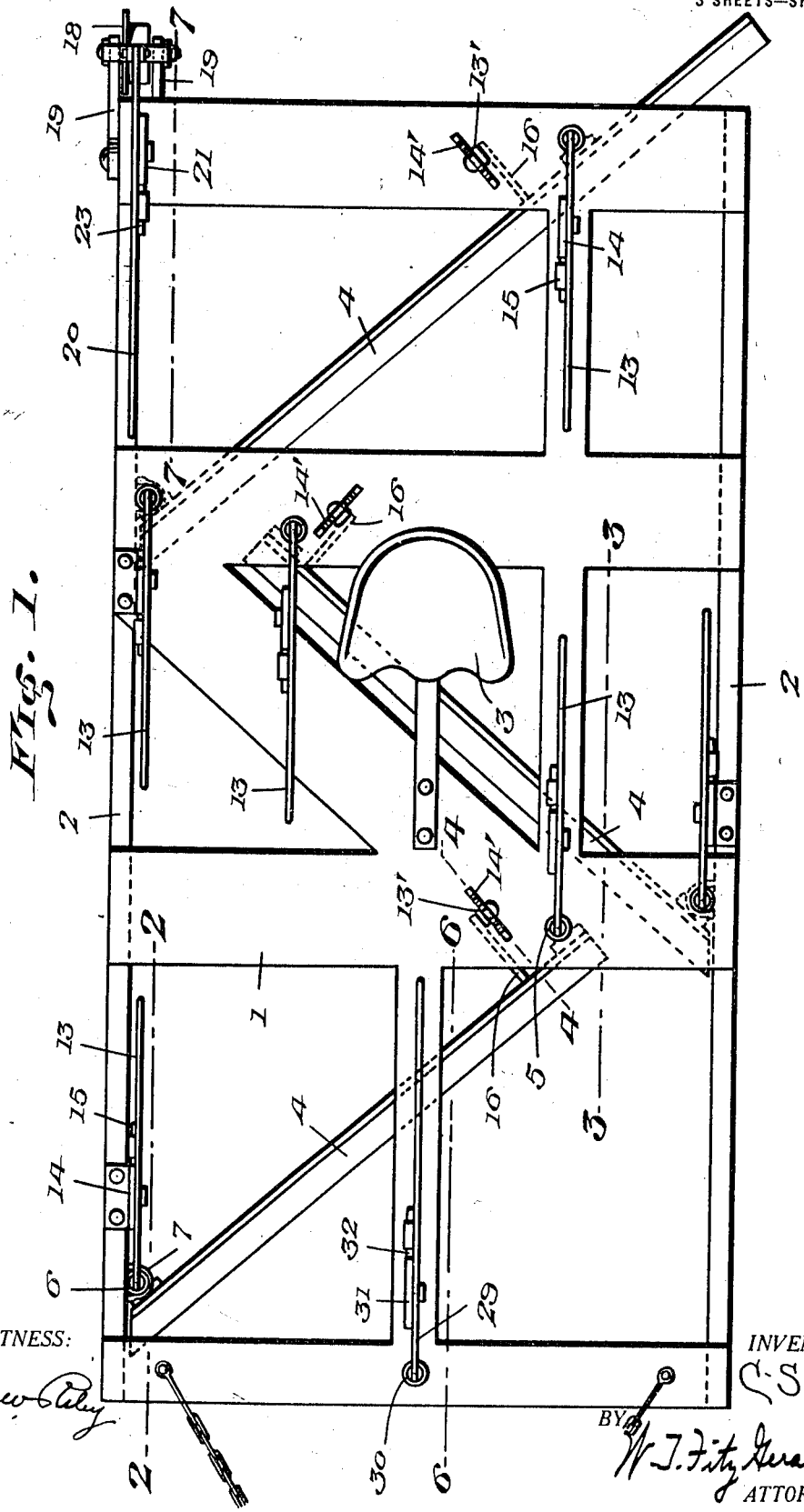

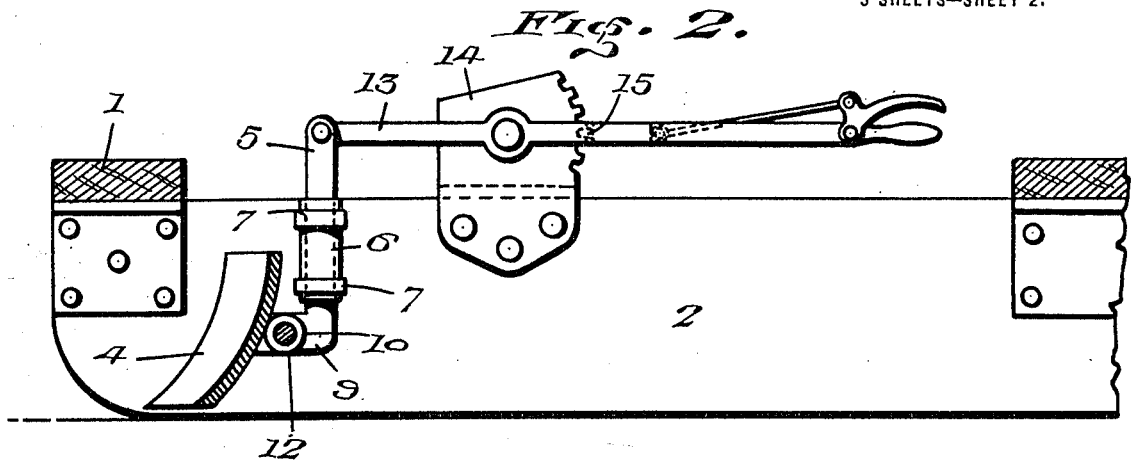
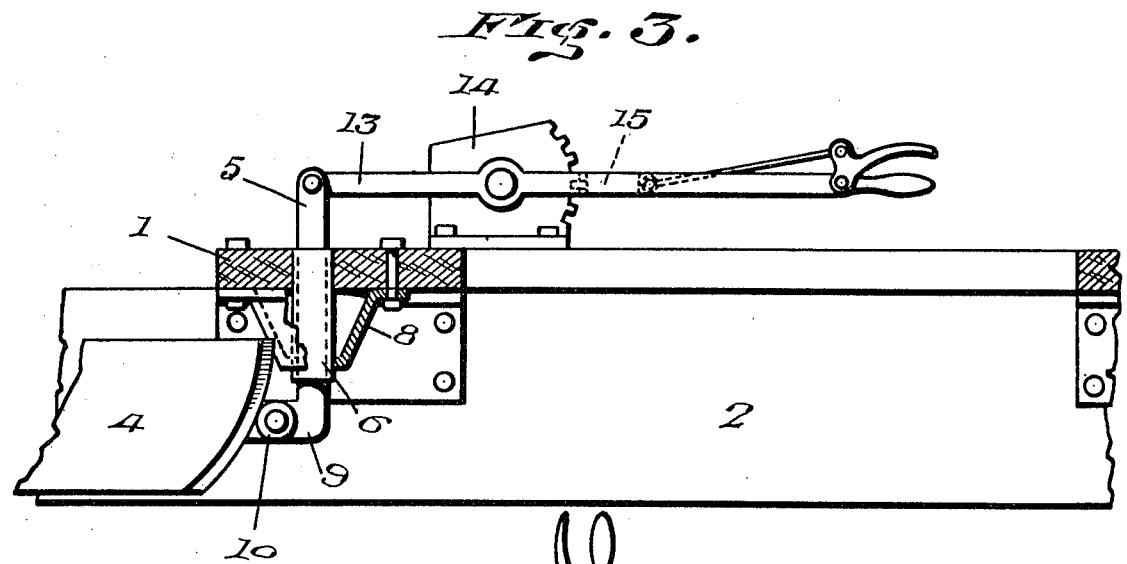
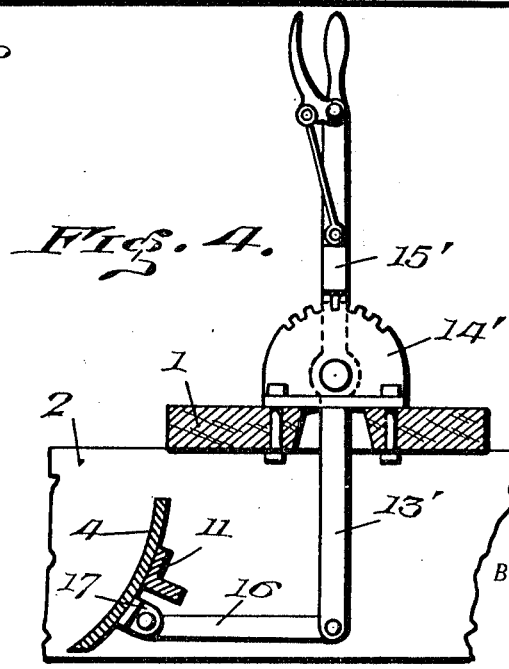

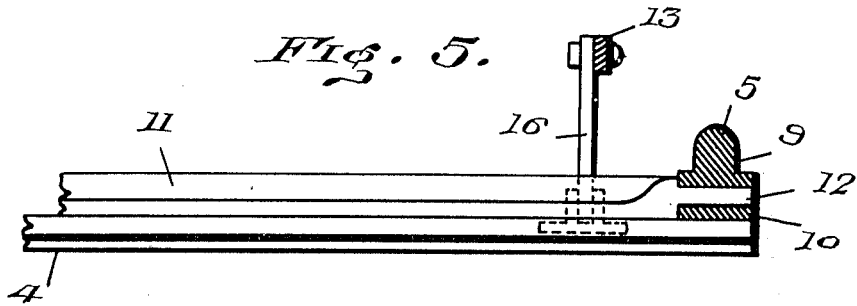
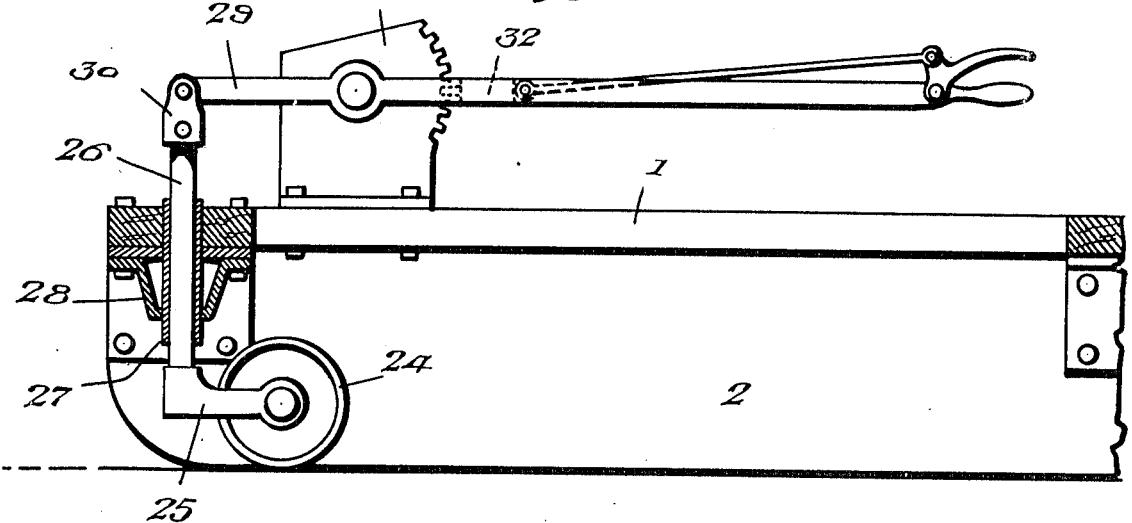
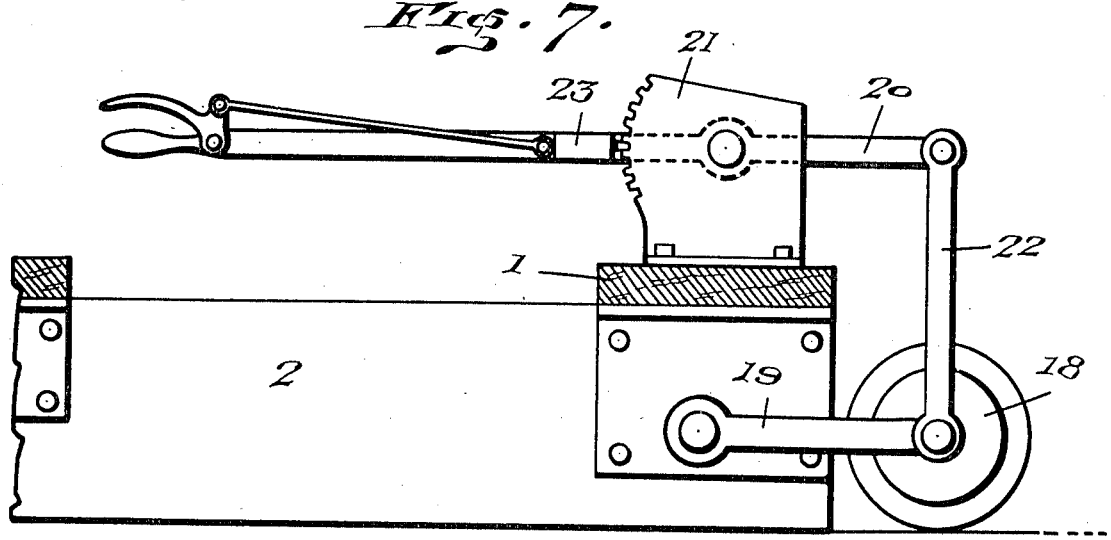

CLARENCE SAMDAHL, OF BRITTON, SOUTH DAKOTA.

ROAD-DRAG.

1,317,037.   Specification of Letters Patent.   Patented Sept. 23, 1919.

Application filed March 1, 1919. Serial No. 279,971.

*To all whom it may concern:*

Be it known that I, CLARENCE SAMDAHL, a citizen of the United States, residing at Britton, in the county of Marshall and State of South Dakota, have invented certain new and useful Improvements in Road-Drags; and I do hereby declare the following to be a full, clear, and exact description of the invention, such as will enable others skilled in the art to which it appertains to make and use the same.

The present invention relates to road drags or scrapers and aims to provide a drag having scraper blades mounted in a novel manner whereby they scrape and deflect the dirt back and forth sidewise as the drag is drawn over the road, thereby filling up ruts or holes in the road, and smoothing out and leveling the surface in an efficient manner.

Another object is the provision of such a drag including a frame mounted on runners and novel means for adjustably supporting the scraper blades from the frame, in order that the blades can be raised and lowered at opposite ends, and can be tilted backwardly and forwardly, to provide for the proper action of the blades on the ground.

The invention also has for its object the improvement of the structure of the drag to enhance the utility and efficiency thereof, and enabling the drag to be constructed at small cost.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:

Figure 1 is a plan view of the improved drag.

Figs. 2, 3 and 4 are sections on the respective lines 2—2, 3—3, and 4—4 of Fig. 1 showing the adjustments of the scraper blades.

Fig. 5 is a detail view showing one trunnion of a scraper blade.

Figs. 6 and 7 are sectional views taken on the respective lines 6—6 and 7—7 of Fig. 1 to show the guide and caster wheels.

A suitable frame 1 is provided having parallel longitudinal runners 2 at the opposite sides to slide on the ground when the drag is pulled by the draft animals. A seat 3 for the operator is mounted on the frame at the center thereof in order that the operator can readily reach the various levers so as to make adjustments quickly and conveniently.

A longitudinal series of scraper blades 4 are carried by the frame between the runners 2, and are in zig-zag arrangement, as seen in Fig. 1. Each blade is disposed obliquely with one end adjacent to one runner, and the opposite end spaced a suitable distance from the opposite runner, and the blades alternate, in order that when the drag is pulled over the ground, the loose dirt will first be deflected by one blade toward one side past the rear end thereof, and will then be deflected toward the opposite side by the next blade. This results in the loose dirt being deflected back and forth sidewise as the drag is moved forwardly, in order to fill up ruts in the road and smooth off the surface. The rear end of the rearmost blade extends behind the corresponding runner 2, in order that the dirt deflected by said blade will be directed to one side of the path of the drag, instead of being left on the scraped surface.

Each scraper blade is mounted for vertical adjustment at its opposite ends, and for this purpose a pair of vertical standards or shanks 5 are provided at the opposite ends of each blade. These standards 5 are slidable vertically in tubular guides 6, and those guides 6 which are at those ends of the blades which extend close to the runners 2 are clamped to the inner sides of said runners by means of U-bolts 7 or the like, while the other guides 6 are secured within the top of the frame and made rigid by the depending braces 8. The lower ends of the standards have portions 9 extending forwardly at an angle, and provided with bearings 10. A longitudinal angle iron 11 or other stiffening member is secured to the rear side of each scraper blade between the upper and lower edges thereof, and its terminals are offset rearwardly and formed into trunnions 12 which are journaled loosely in the bearings 10 of the corresponding pair of standards, thus mounting the scraper blade for tilting movement about a longitudinal axis, enabling the scraper blade to be tilted forwardly and rearwardly according to different conditions. The upper ends of the standards 5 are pivotally connected with suitable hand levers 13 fulcrumed on quadrants 14 upstanding from the frame 1 and runners 2, whereby said levers can be manipulated for raising and lowering the ends of the blades to set them in the desired positions. The levers 13 carry dogs engageable with the quadrants 14 for holding the blades in the desired position. These levers 13 are so arranged as to be within convenient reach from the seat 3, as seen in Fig. 1, in order that the operator can adjust the blades during the operation of the drag.

In order to tilt the blades and hold them in various inclined positions, levers 13' are fulcrumed to quadrants 14' upstanding from the frame, and said levers have dogs 15' to engage the quadrants similar to the levers above described. The lower arms of the levers 13' depend from the frame and are connected by links 16 with pivots 17 secured to the blades 4 below the angle iron 11, said levers 13' and links 16 being in rear of the respective blades. Thus, by swinging the levers 13', the links 16 will push or pull the lower edge portions of the blades to tilt same.

In order to guide the drag and resist the tendency of the side draft from shifting the drag laterally out of place, a flanged guide wheel 18 trails in rear of the runner 2 opposite the rear end of the rearmost blade 4, this runner being at the center of the road, so that the dirt is discharged from the rear blade toward the side of the road. The mounting of the wheel 18, as shown, includes links 19 pivoted at their forward ends to the runner 2 in front of the wheel 18, and engaging the axle of said wheel at their rear ends, thus permitting said wheel to be adjusted upwardly and downwardly, for which purpose a hand lever 20 is fulcrumed on an upstanding quadrant 21 carried by the frame. The rear end of the lever 20 is connected to the axle of the wheel 19 by links 22 in order that the lever can be swung for raising and lowering said wheel and causing it to be depressed into the ground to the desired depth as found necessary. The lever 20 has a dog 23 to engage the quadrant 21 for retaining the wheel 18 in its adjusted position.

As a means for facilitating turning the drag around, a caster wheel 24 is provided at the forward end thereof midway between the runners, and is mounted so that it can be lowered to raise the forward ends of the runners off of the ground, thus supporting the drag on the rear ends of the runners and the caster wheel 24. This will permit the drag to be easily turned around. The wheel 24 is mounted in a fork 25 carried by the lower end of a post 26 that is slidable and rotatable within a vertical tubular guide 27 secured within the forward end of the frame, and braced by a depending brace 28. A hand lever 29 is fulcrumed to an upstanding quadrant 31 carried by the frame, and has a dog 32 engageable with the quadrant to hold the frame and wheel 24 in adjusted position. A swivel connection 30 is provided between the lever 29 and upper end of the post 26, permitting said post to turn. During the ordinary use of the guide, the wheel 24 is raised out of the way, and when it is desired to turn the drag around, the lever 29 is manipulated to depress the wheel 24 thereby raising the forward end of the frame off the ground, and after the frame is turned the lever 29 can be operated to let the forward end of the frame down and raise the wheel 24, so that the drag will again ride on the runners.

Having thus described the invention, what is claimed as new is:—

1. A road drag comprising a frame, a longitudinal series of oblique scraper blades under the frame in zig-zag arrangement to deflect the dirt sidewise from one blade to the other, and a pair of independent adjusting means carried by the frame for supporting the opposite ends of each blade for vertical adjustment, providing for the independent adjustment of either end of each blade.

2. A road drag embodying a frame having longitudinal runners at opposite sides, a longitudinal series of oblique scraper blades below the frame between said runners in zig-zag arrangement to deflect the dirt sidewise between the runners from one blade to another, one end of each blade being close to one runner and the other end spaced from the opposite runner, a plurality of independent adjusting members mounted on the frame for manual movement, and connections between said adjusting members and opposite ends of the blades supporting each end of each blade for independent vertical adjustment.

3. A road drag comprising a frame, a longitudinal series of oblique scraper blades underneath the frame in zig-zag arrangement to deflect the dirt sidewise from one blade to another, a pair of independent adjusting means for each blade connected to and supporting the opposite ends thereof for independent vertical adjustment and mounted on the frame, and independent adjusting means mounted on the frame and connected to the blades for tilting them to different positions.

4. A road drag comprising a frame having longitudinal runners at opposite sides, a longitudinal series of oblique scraper blades under the frame between said runners in zig-zag arrangement to deflect the dirt sidewise between the runners from one blade to another, each blade having one end close to one runner, and the other end spaced from the opposite runner, adjusting members mounted on the frame and operable manually independent of one another, connections between said adjusting members and opposite ends of the blades to support each end of each blade for independent vertical adjustment from the frame and for tilting movement, and an independent adjusting member for each blade mounted on the frame and connected to the blade for tilting it to different positions.

In testimony whereof I have signed my name to this specification in the presence of two subscribing witnesses.

CLARENCE SAMDAHL.

Witnesses:
 EDWIN HEINZ,
 F. L. FARRAR.